US009767683B2

(12) United States Patent
Shimizu et al.

(10) Patent No.: US 9,767,683 B2
(45) Date of Patent: Sep. 19, 2017

(54) BATTERY MONITORING DEVICE

(71) Applicant: YAZAKI CORPORATION, Tokyo (JP)

(72) Inventors: Hidehiko Shimizu, Shizuoka (JP); Haruhiko Yoshida, Shizuoka (JP); Ryohtaroh Murata, Shizuoka (JP); Yoichi Ido, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/047,335

(22) Filed: Feb. 18, 2016

(65) Prior Publication Data
US 2016/0247389 A1 Aug. 25, 2016

(30) Foreign Application Priority Data

Feb. 19, 2015 (JP) ................. 2015-030529

(51) Int. Cl.
| | |
|---|---|
| *G08B 21/00* | (2006.01) |
| *G08C 17/02* | (2006.01) |
| *H01M 10/42* | (2006.01) |
| *G08B 21/18* | (2006.01) |

(52) U.S. Cl.
CPC .......... *G08C 17/02* (2013.01); *H01M 10/425* (2013.01); *H01M 10/4207* (2013.01); *G08B 21/182* (2013.01); *H01M 2220/20* (2013.01)

(58) Field of Classification Search
CPC combination set(s) only.
See application file for complete search history.

(56) References Cited

U.S. PATENT DOCUMENTS 6,198,253 B1 * 3/2001 Kurle ................... A61N 1/3975
320/132
7,202,636 B2 * 4/2007 Reynolds ................ H02J 7/022
320/166
(Continued)

FOREIGN PATENT DOCUMENTS

| JP | 2011-164066 A | 8/2011 |
|---|---|---|
| JP | 2013-21902 A | 1/2013 |

(Continued)

*Primary Examiner* — Travis Hunnings
(74) *Attorney, Agent, or Firm* — Kenealy Vaidya LLP

(57) ABSTRACT

A battery monitoring device which is mounted in a vehicle and detects state information of a battery including a plurality of cells connected in series, the battery monitoring device is provided with a detection unit mounted on the battery, and a mounting member mounted on the battery. The detection unit comprises a board including a circuit for detecting the state information of the battery, and a first non-contact communication unit which is mounted on the board and performs non-contact communication via electromagnetic wave. The mounting member comprises a second non-contact communication unit which performs non-contact communication via the electromagnetic wave. The first non-contact communication unit transfers the state information of the battery to the second non-contact communication unit, and the second non-contact communication unit transfers the state information of the battery transferred from the first non-contact communication unit to a host device.

6 Claims, 7 Drawing Sheets

(56) References Cited

U.S. PATENT DOCUMENTS

| | | | | |
|---|---|---|---|---|
| 2012/0182132 | A1* | 7/2012 | McShane | H01M 10/486 340/10.51 |
| 2012/0211569 | A1* | 8/2012 | Krawczewicz | H01M 10/488 235/492 |
| 2012/0280695 | A1 | 11/2012 | Sekizaki et al. | |

FOREIGN PATENT DOCUMENTS

| | | |
|---|---|---|
| JP | 2014-38394 A | 2/2014 |
| WO | 2014/024657 A1 | 2/2014 |

* cited by examiner

BATTERY MONITORING DEVICE

CROSS REFERENCE TO RELATED APPLICATIONS

This application claims priority from Japanese Patent Application No. 2015-030529 filed on Feb. 19, 2015, the entire contents of which are incorporated herein by reference.

BACKGROUND OF THE INVENTION

Field of the Invention

The present invention relates to battery monitoring devices.

Description of Related Art

Battery monitoring devices have been mounted in vehicles such as hybrid cars and electric cars. The battery monitoring device monitors a battery mounted in a vehicle and transmits a monitoring result to a host device. In this case, the host device is required to be electrically insulated from the battery mounted in the vehicle. Thus, the battery monitoring device includes a high-voltage circuit for monitoring a voltage, etc. of the battery to obtain a monitoring result and a low-voltage circuit for transmitting the monitoring result to the host device, wherein the high-voltage circuit and the low-voltage circuit perform communication via an insulation element therebetween in an electrically insulated state therebetween (see a patent literature 1, for example).

[Patent Literature 1] JP-A-2011-164066

According to a related art, a battery monitoring device requires an insulation element for electrically insulating between a battery mounted in a vehicle and a host device, a number of components increases and a circuit size becomes large.

SUMMARY

One or more embodiments provide a battery monitoring device which can ensure insulation properties between a battery mounted in a vehicle and a host device without providing an insulation element.

According to one or more embodiments, a battery monitoring device which is mounted in a vehicle and detects state information of a battery including a plurality of cells connected in series, the battery monitoring device is provided with a detection unit mounted on the battery, and a mounting member mounted to the battery. The detection unit includes a board including a circuit for detecting the state information of the battery, and a first non-contact communication unit which is mounted on the board and performs non-contact communication via electromagnetic wave. The mounting member includes a second non-contact communication unit which performs non-contact communication via the electromagnetic wave. The first non-contact communication unit transfers the state information of the battery to the second non-contact communication unit, and the second non-contact communication unit transfers the state information of the battery transferred from the first non-contact communication unit to a host device.

In the battery monitoring device of one or more embodiments, the first non-contact communication unit and the second non-contact communication unit may be arranged to face each other.

In the battery monitoring device of one or more embodiments, the first non-contact communication unit may include a first antenna, and the second non-contact communication unit may include a second antenna. The first antenna and the second antenna can mutually transmit and receive the electromagnetic wave.

In the battery monitoring device of one or more embodiments, the second antenna may include a plurality of antennas, the battery may include a plurality of batteries, and each of the plurality of the antennas may correspond to each of the plurality of the batteries, respectively. One of the plurality of the antennas may be connected to another adjacent antenna. The second antenna may be connected to the host device via a single communication line.

In the battery monitoring device of one or more embodiments, a bus bar module may be mounted on the battery. The bus bar module may include bus bars for transmitting respective voltages of the plurality of cells to the detection unit. The bus bar module may be covered with the mounting member.

According to one or more embodiments, a battery monitoring device which can ensure insulation properties between a battery mounted in a vehicle and a host device can be provided without an insulation element.

DETAILED DESCRIPTION

Figure 1:
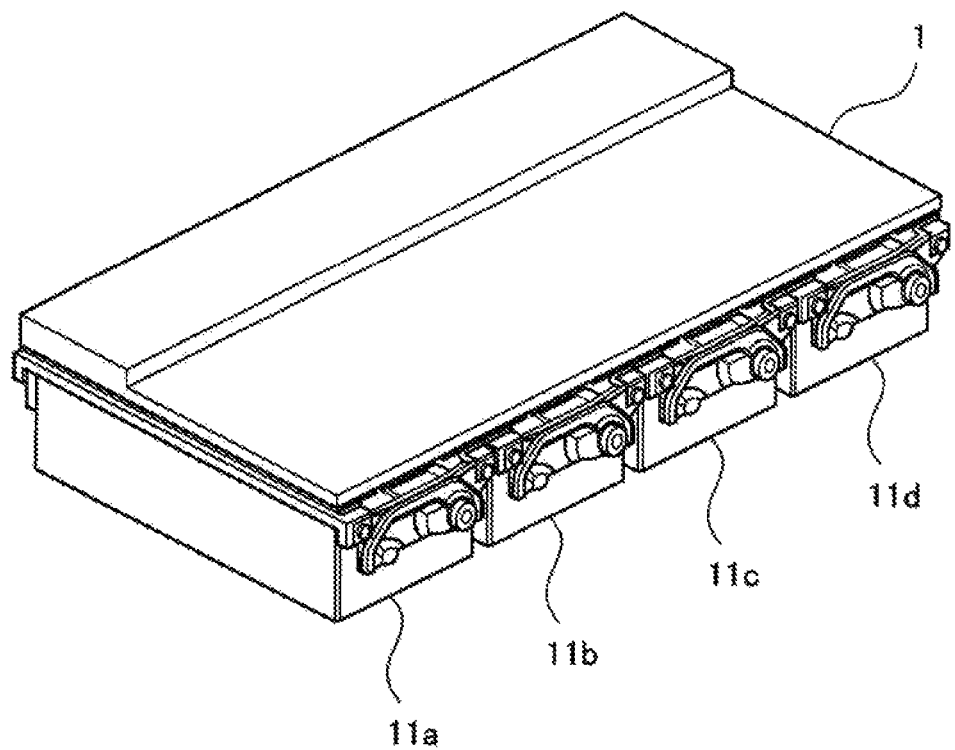
FIG. 1 is a perspective view showing an entirety of a battery monitoring device 1 and batteries 11a, 11b, 11c and 11d according to an embodiment.

FIG. 1 is a perspective view showing an entirety of a battery monitoring device 1 and batteries 11a, 11b, 11c and 11d according to an embodiment. The battery monitoring device 1 is provided in a not-shown vehicle. Such the vehicle is a hybrid car, an electric car or the like and provided with secondary batteries, various kinds of motors, etc. Each of the various kinds of motors is driven by being fed with electric power from the secondary batteries. As described later, the batteries 11a, 11b, 11c and 11d, each constituted as the secondary battery, supply electric power to the various kinds of motors.

Figure 2:
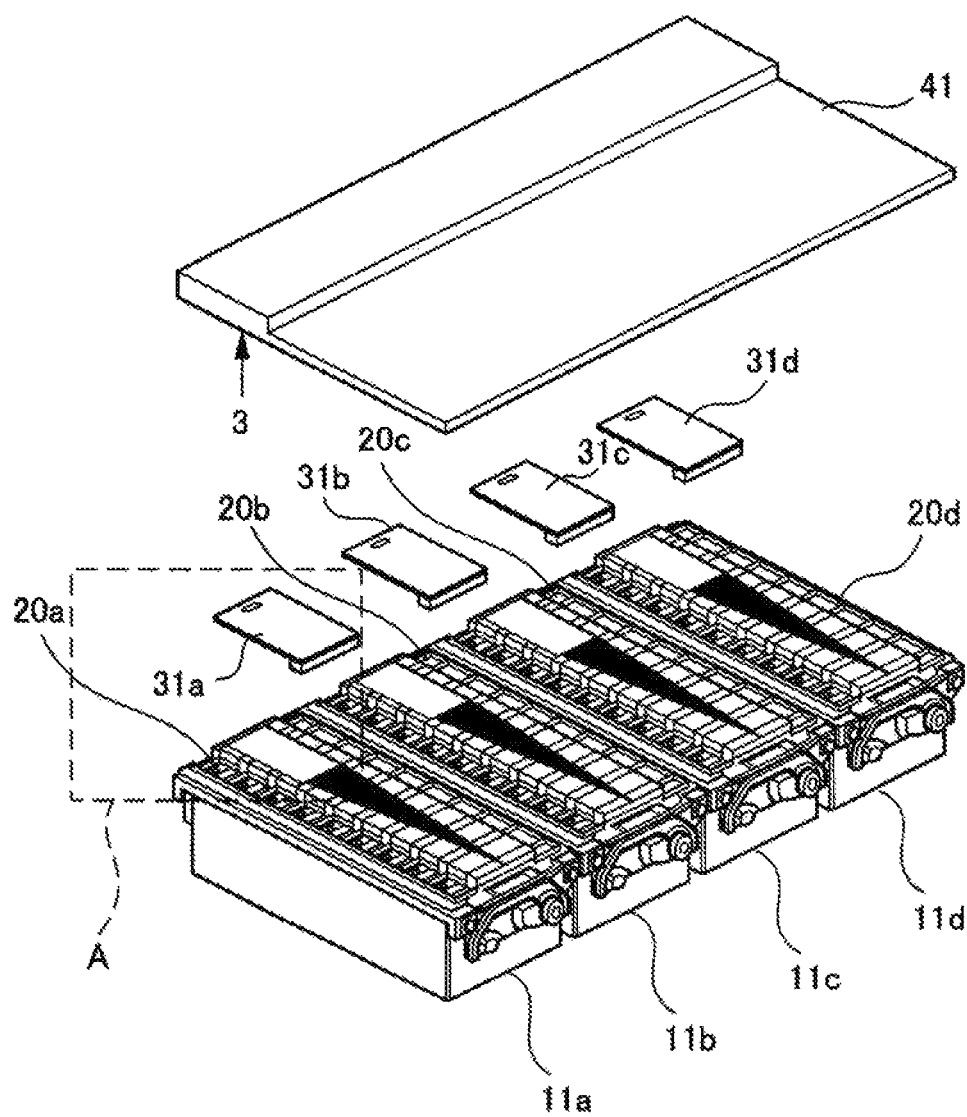
FIG. 2 is an exploded perspective view of the battery monitoring device 1 shown in FIG. 1.

FIG. 2 is an exploded perspective view of the battery monitoring device 1 shown in FIG. 1. As shown in FIG. 2, the battery monitoring device 1 monitors the batteries 11a, 11b, 11c and 11d constituted of a plurality of cells 5 connected in series (described later with reference to FIGS. 6 and 7). Each of the batteries 11a, 11b, 11c and 11d is constituted of the secondary battery and performs charging and discharging. In the following explanation, each of these batteries is merely referred by a symbol 11 except for a case that the explanation is made as to particular one or ones of the batteries 11a, 11b, 11c and 11d.

The battery 11 is monitored with respect to status information. The status information includes a temperature and a voltage of the battery 11 and is transferred to a host device such as a battery ECU (Electronic Control Unit) 51 described later with reference to FIGS. 6 and 7. By doing so, the host device can calculate a charge termination state, a discharge termination state, a battery residual capacity and temperature correction information of the battery 11 based on a temperature and a voltage of the battery 11. The host device is not limited to the battery ECU 51 described later but may be another ECU (not shown).

The batteries 11a, 11b, 11c and 11d are provided in correspondence to bus bar modules 20a, 20b, 20c and 20d, respectively. As described later with reference to FIG. 3, each of the bus bar modules 20a, 20b, 20c and 20d is constituted by providing terminals 22 and bus bars 23 on a resin plate. Specifically, the bus bar module 20a is provided at the battery 11a. Anode side terminals and cathode side terminals of the cells 5 (described later) of the battery 11a are connected to the terminals 22 respectively, and the bus bars 23 are wired to the respective terminals 22. Each of the bus bar modules 20b, 20c and 20d has substantially the same functional configuration as the bus bar module 20a, explanation thereof is omitted. In the following explanation, each of these bus bar modules is merely referred by a symbol 20 except for a case that the explanation is made as to particular one or ones of the bus bar modules 20a, 20b, 20c and 20d.

The battery monitoring device 1 includes detection units 31a, 31b, 31c and 31d. The detection unit 31a is provided on the battery 11a, and includes a board 33 having a circuit for detecting state information of the battery 11 and a first non-contact communication unit for performing non-contact communication via electromagnetic wave. The detection unit 31a is detachably attached to the bus bar module 20a. Although electrically the detection unit 31a performs non-contact communication via electromagnetic wave, structurally this detection unit performs non-contact communication via air.

Figure 3:
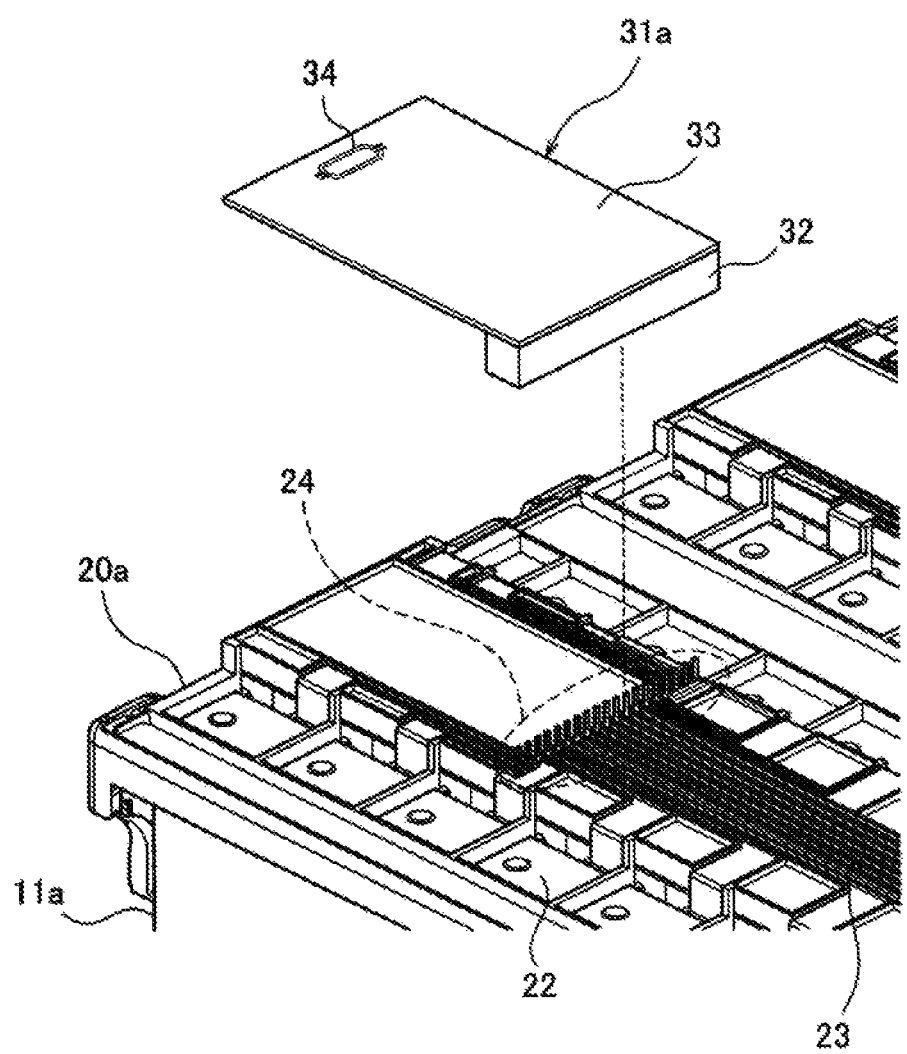
FIG. 3 is an enlarged diagram of a enclosed portion A in FIG. 2.

Each of the detection unit 31a and the bus bar module 20a will be explained concretely with reference to FIG. 3. FIG. 3 is an enlarged diagram of a portion A enclosed by a dotted line in FIG. 2. As shown in FIG. 3, the bus bar module 20a is configured in a manner that the terminals 22 electrically connected to the respective cells 5 (described later), the bus bars 23 wired from the respective terminals 22 so as to introduce voltages of the respective cells 5 (described later) to the detection unit 31a, and board side terminals 24 formed at end portions of the respective bus bars 23 are provided on the resin plate. In this respect, as each of the board side terminals 24 serves to connect the detection unit 31a, a terminal shape thereof may be either a male-type or a female-type so long as the each board side terminal is electrically and structurally connected to the detection unit 31a.

As described above, the detection unit 31a includes the board 33. The board 33 is provided with a board connector 32. As the board connector 32 serves to connect the board side terminals 24, each shape of terminals of this connector may be either a male-type or a female-type so long as the board connector is electrically and structurally connected to the board side terminals 24.

As described above, the board 33 includes the first non-contact communication unit. In an example shown in FIG. 3, the first non-contact communication unit is constituted of a first antenna 34. The first antenna 34 transmits and receives electromagnetic wave at a time of performing short-range radio communication conforming to, for example, ISO/IEC 18092 or ISO/IEC 14443.

For example, after an engine of the vehicle starts, the detection unit 31a obtains state information of the battery 11a at a constant period and transfers the obtained results of the state information of the battery 11a to the host device. A high-voltage circuit 25 (described later) for detecting state information of the battery 11a is provided on the board 33.

Incidentally, the circuit provided on the board 33 is the high-voltage circuit 25 as described later.

Explanation will be returned to FIG. 2. Each of the detection units 31b, 31c and 31d has substantially the same functional configuration and arrangement configuration as the detection unit 31a, explanation thereof is omitted. In the following explanation, each of these detection units is merely referred by a symbol 31 except for a case that the explanation is made as to particular one or ones of the detection units 31a, 31b, 31c and 31d.

The battery monitoring device 1 includes a mounting member 41. The mounting member 41 is mounted on the batteries 11 and includes second non-contact communication units for performing non-contact communication with the first non-contact communication units via electromagnetic wave, respectively. The bus bars 23 for introducing voltages of the cells 5 (described later) to the respective detection units 31 are wired on the mounting member 41. The mounting member covers the bus bar modules 20 provided between the batteries 11 and the first antennas 34, and is provided with second antennas 44. Although electrically the mounting member 41 performs non-contact communication via electromagnetic wave, structurally this mounting member performs non-contact communication via air.

Specifically, the second non-contact communication units are provided on the lower surface side of the mounting member 41. As the mounting member 41 is disposed above the bus bar modules 20, the second non-contact communication units are arranged so as to oppose the first non-contact communication units provided on the detection units 31, respectively. In other words, the first non-contact communication units like the first antennas 34 are arranged so as to oppose the second non-contact communication units like the second antennas 44, respectively.

The opposedly arranged state includes a state that a part of the first antenna 34 opposes a part of the second antenna 44. For example, the opposedly arranged state in a positional relation between the first antenna 34 and the second antenna 44 includes a state that the second antenna 44 is deviated to the left direction with respect to the first antenna 34 and so a part of the first antenna 34 overlaps with a part of the second antenna 44. That is, the opposedly arranged state includes a state that the first and second antennas are partially opposed but the remaining portions thereof are not opposed. In other words, the opposedly arranged state may be an optional state so long as the first and second antennas are partially overlapped. Incidentally, even in a state that the mounting member 41 opposes each of the detection units 31b, 31c and 31d but partially opposes the detection unit 31a and does not oppose the remaining portion of this detection unit, it is supposed that the mounting member 41 opposes the detection units 31.

Figure 4:
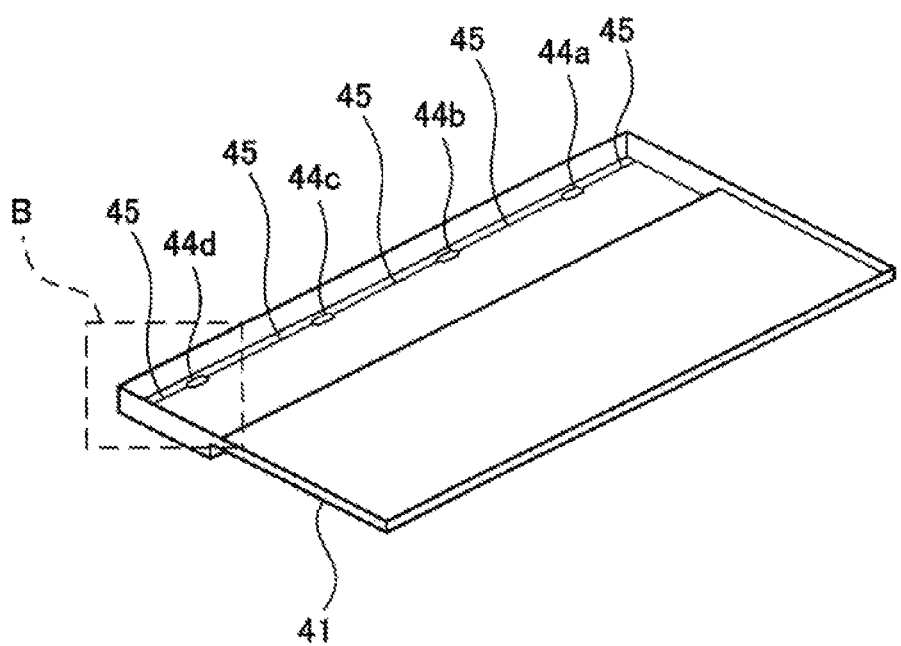
FIG. 4 is a diagram showing a mounting member 41 in a state of being seen from an arrow direction 3 in FIG. 2.

The mounting member 41 will be explained in detail with reference to FIG. 4. FIG. 4 is a diagram showing the mounting member 41 in a state of being seen from an arrow direction 3 in FIG. 2. As shown in FIG. 4, the second non-contact communication units of the mounting member 41 are constituted of the second antennas 44*a*, 44*b*, 44*c* and 44*d*, respectively. Each of the second antennas 44*a*, 44*b*, 44*c* and 44*d* transmits and receives electromagnetic wave at a time of performing the short-range radio communication conforming to, for example, ISO/IEC 18092 or ISO/IEC 14443.

The short-range radio communication employs, for example, NFC (Near Field Communication) standard for transmitting a signal in a non-contact manner. A communication device conforming to the NFC standard transmits a signal in a non-contact manner and is incorporated in, for example, a non-contact type IC card such as a boarding card or an electronic money card or a small mobile device such as a mobile phone or a smart phone.

In the following explanation, each of these second antennas is merely referred by a symbol 44 except for a case that the explanation is made as to particular one or ones of the second antennas 44*a*, 44*b*, 44*c* and 44*d*.

Figure 5:
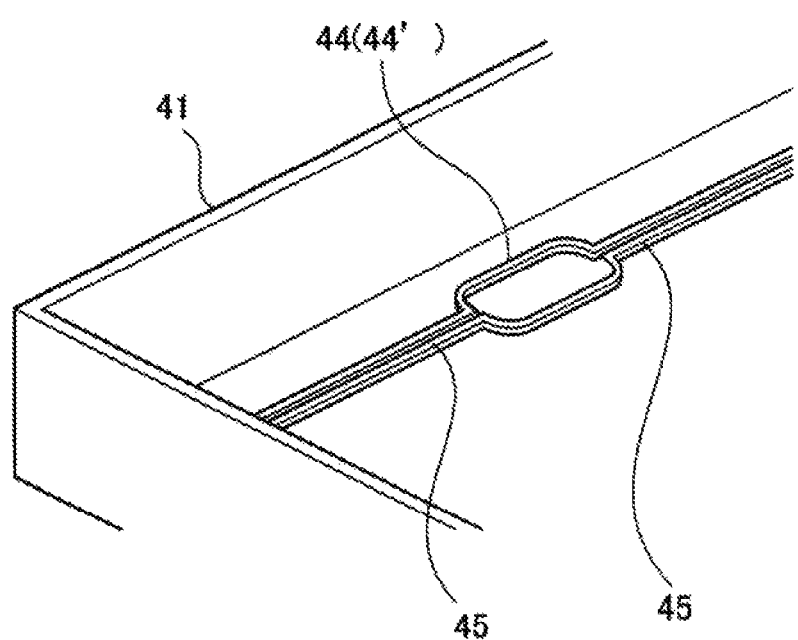
FIG. 5 is an enlarged diagram of a enclosed portion B in FIG. 4.

Next, explanation will be made as to the second antenna 44 used for the short-range radio communication, with reference to FIGS. 4 and 5. FIG. 5 is an enlarged diagram of a portion B enclosed by a dotted line in FIG. 4. As shown in FIG. 5, the second antennas 44 are connected by communication bus bars 45 formed on the lower surface side of the mounting member 41. Specifically, as shown in FIG. 4, each of the communication bus bars 45 connects between the adjacent second antennas 44. Of the plurality of second antennas 44, the second antenna (hereinafter referred to an end antenna 44') disposed at one end side of the mounting member 41 is also provided with the communication bus bar 45 on one side of this second antenna opposite the adjacent second antenna 44. This communication bus bar 45 is formed so as to extend to the one end of the mounting member 41. One of the communication bus bars 45 or one of the second antennas 44 is connected to a communication line 46 described later. The communication line 46 described later is connected to the host device.

As described above, the second antennas 44 are used for communication conforming to, for example, the NFC standard as one of the short-range radio communication standards. In a case of the communication conforming to the NFC standard, the second antenna 44 shown in FIG. 5 performs non-contact communication in a short distance, specifically, only within a narrow range of about 10 cm. Thus, the first antenna 34 forming the first non-contact communication unit and the second antenna 44 forming the second non-contact communication unit are arranged within a narrow range of about 10 cm. In FIGS. 2 and 3, the first antenna 34 and the second antenna 44 are arranged in an opposed manner.

This arrangement will be summarized as follows. The first non-contact communication unit transfers state information of the battery 11 detected by the detection unit 31 to the second non-contact communication unit. The second non-contact communication unit transfers state information of the battery 11, transferred from the first non-contact communication unit, to the host device. As described later, the host device transmits instruction information to the battery monitoring device 1. The first non-contact communication unit and the second non-contact communication unit are arranged in an opposed manner. The first non-contact communication unit and the second non-contact communication unit realize communication in a short distance, specifically, communication within a narrow range of about 10 cm. Thus, as the first non-contact communication unit and the second non-contact communication unit are only required to be arranged in an opposed manner, communication can be realized in a state that an inner space of the battery monitoring device 1 mounted in a limited space of the vehicle is effectively utilized.

The bus bar module 20 is disposed between the battery 11 and the first antenna 34. The bus bars 23 for introducing voltages of the cells 5 (described later) to the detection unit 31 are wired on the bus bar module. The mounting member 41 covers the bus bar modules 20 and is provided with the second antennas 44.

That is, the mounting member 41 is disposed above the bus bar modules 20 and covers the terminals 22, the bus bars 23 and the board side terminals 24 provided on the resin plates of the bus bar modules 20. According to this configuration of the mounting member, each of the high-voltage circuit (described later) of the detection unit 31, the terminals 22 and the bus bars 23 can be avoided being touched by a worker. The mounting member 41 is formed by an insulation member such as resin. Thus, the high-voltage circuit (described later) of the detection unit 31 can be insulated from the periphery.

Figure 6:
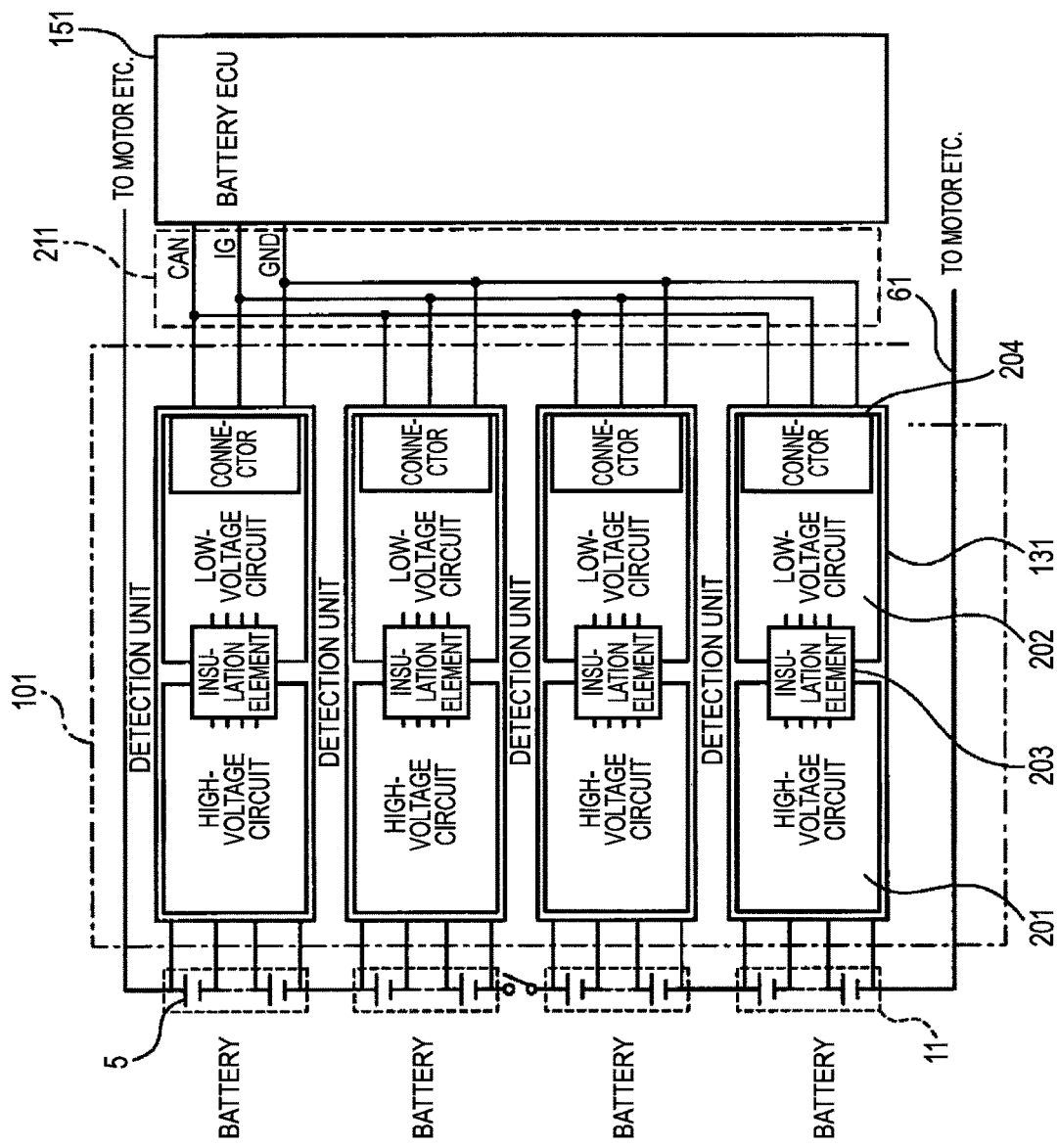
FIG. 6 is a diagram schematically showing an example of an electrical connection configuration of a related art.

The structural configuration of the battery monitoring device 1 is explained above. Next, electrical configuration of the battery monitoring device 1 will be explained. Firstly, prior to the explanation of the electrical configuration of the battery monitoring device 1, electrical configuration of the battery monitoring device of a related art will be explained with reference to FIG. 6. FIG. 6 is a diagram schematically showing an example of an electrical connection configuration of the related art. As shown in FIG. 6, a battery monitoring device 101 is connected to a battery ECU 151 via a wire harness 211. The wire harness 211 includes a CAN communication line, a power supply line and a ground line. The wire harness supplies electric power to the battery monitoring device 101 and the battery ECU 151, and transmits and receives various kinds of signals by communication conforming to a CAN protocol. In this respect, the power supply line is connected to, for example, an ignition power supply. The ground line is connected to, for example, the vehicle body. The CAN communication line is connected to various kinds of devices for performing communication conforming to the CAN protocol.

The battery monitoring device 101 includes detection units 131 for detecting state information of corresponding batteries 11, respectively. Each of the batteries 11 has a plurality of cells 5 connected in series. Each of the cells 5 is a secondary battery with an electromotive force of about 1 to 2V such as a nickel hydride battery or a lithium battery. The cells are used as an assembled battery of a high voltage by serially connecting several tens, for example, about 10 to 24 cells. A total voltage of the batteries becomes 200V or more by serially connecting all the batteries 11. By doing so, the plurality of batteries 11 connected in series serve as a driving source for supplying electric power to motors, etc. mounted in a vehicle via a power cable 61. Although illustration is omitted, parallel connection of modules, each constituted by serially connecting a plurality of the batteries 11, may be functioned as the driving source for the motors, etc. mounted in the vehicle.

Explanation will be made as to the detection unit 131. The detection unit 131 includes a high-voltage circuit 201, a low-voltage circuit 202 and an insulation element 203. The insulation element 203 is provided between the high-voltage circuit 201 and the low-voltage circuit 202. The insulation element 203 transmits and receives various kinds of signals between the high-voltage circuit 201 and the low-voltage circuit 202 while maintaining an electrically insulated state between the high-voltage circuit 201 and the low-voltage circuit 202. For example, the insulation element is constituted of a photo coupler using light as communication medium or a magnetic coupler using magnetism as communication medium.

The high-voltage circuit 201 detects state information of the battery 11. The high-voltage circuit 201 includes a not-shown microcomputer. When this microcomputer executes various kinds of processings, state information of the battery 11 is subjected to an A/D conversion, then processing of various kinds of signals is executed and the various kinds of signals are transmitted to the insulation element 203.

The low-voltage circuit 202 includes a connector 204. The connector 204 is connected to the battery ECU 151 via the wire harness 211. The low-voltage circuit 202 includes a not-shown microcomputer. When this microcomputer executes various kinds of processings, the state information of the battery 11 transmitted from the insulation element 203 is subjected to an A/D conversion, then processing of the various kinds of signals is executed and the various kinds of signals are transmitted to the battery ECU 151 via the wire harness 211 in a format conforming to the CAN protocol.

The battery ECU 151 manages the battery monitoring device 101. For example, the battery ECU performs uniform charging for uniforming voltages of the respective cells 5 based on the state information of the battery 11 transmitted from the battery monitoring device 101, that is, an SOC (State of Charge) as various kinds of states of the battery 11 described above.

The battery ECU 151 and the low-voltage circuits 202 are connected to respective devices each for performing communication conforming to the CAN protocol. Each of these devices is operated by a power supply of, for example, 12V. On the other hand, as described above, each of the high-voltage circuits 201 is connected to the battery 11 having the total voltage of, for example, 200V or more. In this manner, as the operation voltage differs between the high-voltage circuit 201 and the low-voltage circuit 202, it is required to insulate between the high-voltage circuit 201 and the low-voltage circuit 202. Thus the communication is performed via the insulation element 203. The low-voltage circuit 202 is connected to the battery ECU 151 using the wire harness 211 via the connector 204, and the communication is performed therebetween.

As a result, in the battery monitoring device 101, the insulation element 203 is required to be inserted between the high-voltage circuit 201 and the low-voltage circuit 202. Thus, it is necessary to provide a process of wiring between the low-voltage circuit 202 and the battery ECU 151. The provision of the insulation elements 203 results in increase of the number of components. Further, a working process at a time of assembling the battery monitoring device 101 to the vehicle becomes complicated, and a cost of the battery monitoring device 101 increases.

Figure 7:
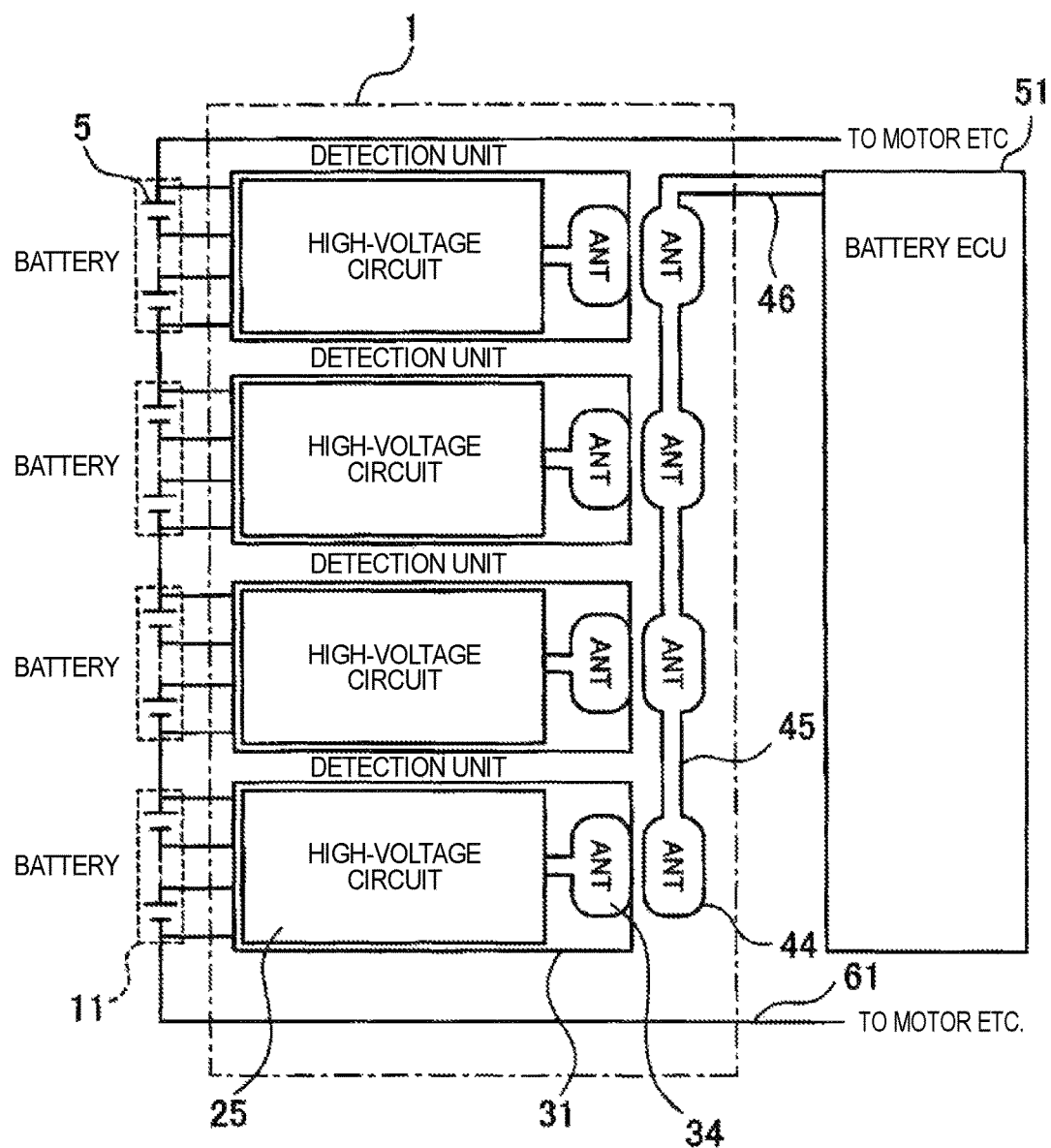
FIG. 7 is a diagram schematically showing an example of an electrical connection configuration according to the embodiment.

In view of such the circumstances of the related art, the battery monitoring device 1 is proposed in order to ensure both a low cost and insulation properties and simplify the assembling work. FIG. 7 is a diagram schematically showing an example of an electrical connection configuration according to the embodiment. As shown in FIG. 7, the battery monitoring device 1 includes the detection units 31 each for detecting state information of the corresponding battery 11 constituted of the serially connected cells 5, and the second antennas 44. The second antennas 44 are provided in correspondence to the batteries 11, respectively. In the second antennas 44, each pair of the adjacent second antennas are connected via corresponding one of the communication bus bars 45. One of the communication bus bars 45 is connected to the single communication line 46. This single communication line 46 is connected to the host device, specifically, the battery ECU 151. As each of the second antenna 44 and the communication bus bar 45 is at an electrically common potential, each of the second antenna 44 and the communication bus bar 45 has a common voltage.

In the example shown in FIG. 7, the explanation is made as to the case that one of the communication bus bars 45 is connected to the communication line 46. Alternatively, one of the second antennas 44 may be connected to the communication line 46. Although, of the plurality of second antennas 44, the second antenna 44 on the most upstream side is not provided at its one end with the communication bus bar 45, the communication bus bar 45 may also be provided at the one end of this second antenna, and a termination resistor may be provided at an upstream side end of this communication bus bar 45.

As each of the second antennas 44 is paired with corresponding one of the first antennas 34, each of the first antennas 34 related to corresponding one of the batteries 11 is also related to corresponding one of the second antennas 44. In the following explanation, explanation of constituent elements substantially same as those of the battery monitoring device 101 of the related art will be omitted.

The detection unit 31 includes the high-voltage circuit 25 and the first antenna 34. The detection unit 31 includes a microcomputer. The detection unit subjects detection results of state information of the battery 11 to an A/D conversion, then executes various kinds of processings and transmits the detection results of state information of the battery 11 in a time division manner to the second antenna 44 via the first antenna 34.

Specifically, the high-voltage circuit 25 subjects the detection results of state information of the battery 11 to the A/D conversion to thereby convert into a digital signal, then modulates the digital signal thus converted and transmits a modulated radio signal to communication medium in the air vis the first antenna 34. The second antenna 44 receives the radio signal transmitted via the communication medium in the air from the first antenna 34. The radio signal thus received is transmitted to the battery ECU 51 via the communication line 46 connected to one of the second antennas 44 or one of the communication bus bars 45. The battery ECU 51 demodulates the transmitted radio signal to extract signals containing the state information of the battery 11. In this respect, transmission/reception of the various kinds of signals between the first antenna 34 and the second antenna 44 is supposed to be performed by the communication conforming to the NFC standard as the short-range radio communication standard. As described above, in the NFC standard, non-contact communication within a narrow range of about 10 cm is performed. Thus, if the first antenna 34 and the second antenna 44 are disposed in an opposed manner, as both the antennas locate within a range capable of performing the non-contact communication, transmission/reception of signals between these antennas can be realized. As this communication conforms to the NFC standard, each of the first antenna 34 and the second antenna 44 can perform communication by electric power generated upon reception of the radio signal.

In this manner, the battery monitoring device 1 according to the embodiment relates to a battery mounting device which is mounted in a vehicle and detects state information of the batteries 11 each having the serially connected cells 5. The battery monitoring device 1 includes the detection units 31 each of which has the board 33 and the first non-contact communication unit. The board is provided on corresponding one of the batteries 11 and has the circuit for detecting state information of the corresponding battery 11. The first non-contact communication unit is mounted on the corresponding board and performs non-contact communication via electromagnetic wave. The battery monitoring device further includes the mounting member 41 which is mounted on the batteries 11 and has the second non-contact communication units each performing non-contact communication with corresponding one of the first non-contact communication units via electromagnetic wave. Each of the first non-contact communication units transfers state information of the corresponding battery 11 to corresponding one of the second non-contact communication units. Each of the second non-contact communication units transfers the state information of the corresponding battery 11, transferred from the corresponding first non-contact communication unit, to the host device.

Accordingly, even if the insulation element 203 is not provided, insulation properties between the detection unit 31 and the host device can be secured by the non-contact communication using the first and second non-contact communication units. That is, without providing the insulation element 203, insulation properties between the battery 11 mounted in the vehicle and the host device can be secured.

As the insulation properties between the battery 11 mounted in the vehicle and the host device can be secured without providing the insulation element 203, increase of the number of components due to the provision of the insulation element 203 can be prevented. Thus, as increase of the number of components can be suppressed, a circuit size does not become large. As a result, a cost of the battery monitoring device can be reduced. Further, as the circuit size does not become large, miniaturization of the battery monitoring device can be realized, and hence the limited space of the vehicle can be effectively utilized.

Further, without wiring the wire harness 21 between the detection unit 31 and the host device, communication between the detection unit 31 and the host device can be established by disposing the first and second non-contact communication units in the opposed manner and performing non-contact communication therebetween. Thus, an assembling procedure can be simplified while ensuring the insulation properties between the battery 11 mounted in the vehicle and the host device, without providing the insulation element 203.

The first and second non-contact communication units are disposed in the opposed manner.

Thus, as the first and second non-contact communication units are only required to be disposed in the opposed manner, a degree of freedom of arrangement of the constituent elements within the battery monitoring device 1 can be improved. As a result, a degree of freedom of design of the battery monitoring device 1 can also be improved.

Each of the first non-contact communication units is constituted of the first antenna 34 capable of transmitting and receiving electromagnetic wave. Each of the second non-contact communication units is constituted of the second antenna 44 capable of transmitting and receiving electromagnetic wave.

As the first antenna 34 and the second antenna 44 are used, the insulation properties between the high-voltage side and the low-voltage side can be ensured without using the insulation element 203.

Further, a plurality of the batteries 11 are provided. The first non-contact communication unit and the second non-contact communication unit are constituted of the first antenna 34 and the second antenna 44, respectively. A plurality of the second antennas 44 are provided in correspondence to the plurality of batteries 11, respectively. Each adjacent pair of the second antennas 44 are connected to each other, and the second antennas 44 are connected to the host device via the single communication line.

As the batteries 11 are made correspond to the second antennas 44, respectively, the various kinds of signals can be transmitted and received between the high-voltage side and the low-voltage side without wiring the wire harness 211.

The bus bar module 20, on which the bus bars 23 for introducing voltages of the cells 5 are wired, is mounted on the battery 11. The mounting member 41 is provided with the second antennas 44 and covers the bus bar modules 20.

Thus, at the time of the assembling, as it is only required to dispose the mounting member 41 so as to oppose the first antennas 34 and the second antennas 44 respectively, the assembling procedure can be simplified.

Although the invention is explained above based on the embodiment, the invention is not limited to this embodiment. The embodiment may be changed or modified in various manners within a range not departing from the gist of the invention.

For example, although the explanation is made as to the example that the first antenna 34 and the second antenna 44 are provided as a communication means between the first and second non-contact communication units, shapes of the first antenna 34 and the second antenna 44 are not limited to particular ones. Each of the first antenna 34 and the second antenna 44 may be a coil which is formed by winding a thin conductive wire for plural times in a flat shape. That is, in a case of performing the short-range radio communication, for example, the transmission side is only required to generate electromagnetic wave, then modulate the electromagnetic wave and transmit data as the demodulated electromagnetic wave. As a result, each of the first and second non-contact communication units is only required to have a configuration capable of transmitting and receiving electromagnetic wave.

Further, for example, in this embodiment, although the first and second non-contact communication units are constituted of the first antenna 34 and the second antenna 44, respectively, the configurations of the first and second non-contact communication units are not limited thereto. For example, each of the first and second non-contact communication units may be constituted of a diode capable of transmitting and receiving an infrared ray.

Specifically, the first non-contact communication unit may include an infrared ray LED as a light emitting element of an infrared ray and a photo diode as a light receiving element of an infrared ray, thus performing infrared-ray communication.

Also, the second non-contact communication unit may include an infrared ray LED as a light emitting element of an infrared ray and a photo diode as a light receiving element of an infrared ray, thus performing infrared-ray communication.

In other words, the first and second non-contact communication units are only required to be respectively constituted of the first antenna 34 and the second antenna 44 each capable of transmitting and receiving electromagnetic wave. Alternatively, each of the first and second non-contact communication units is only required to be constituted of the diode capable of transmitting and receiving an infrared ray. Incidentally, as a peripheral circuit configuration of the diode is well known for persons skilled in the art, the explanation thereof will be omitted.

Further, in this embodiment, a shape of the mounting member 41 is not particularly limited. In brief, the mounting member is only required to have a shape capable of positioning the second antennas 44 so as to oppose the respective first antennas 34 and covering the circuit configuration such as the terminals 22 provided on the bus bar modules 20

Further, in this embodiment, as shown in FIG. 7, although the explanation is made as to the case that a set of the battery 11, the detection unit 31 and the second antenna 44 is provided four, the invention not limited thereto. For example, this set may be provided ten or only single. That is, the number of the set is not particularly limited.

Further, in this embodiment, the explanation is made as to the case that the battery ECU 51 shown in FIG. 7 performs the signal processings such as the modulation/demodulation processing. Alternatively, a signal processing interface may be provided between the communication line 46 and the battery ECU 51 so that this interface executes various kinds of signal processings such as the modulation/demodulation processing and transfers communication data conforming to the CAN protocol to the battery ECU 51.

Furthermore, in this embodiment, the explanation is made as to the case that structurally the non-contact communication between the detection unit 31 and the mounting member 41 is performed via air, whilst electrically the non-contact communication between the detection unit 31 and the mounting member 41 is performed via electromagnetic wave. However, the invention is not limited thereto. For example, an insulation member may be provided between the detection unit 31 and the mounting member 41. In this case, although structurally the non-contact communication between the detection unit 31 and the mounting member 41 is performed via the insulation member, electrically the non-contact communication between the detection unit 31 and the mounting member 41 is performed via electromagnetic wave like the aforesaid case.

REFERENCE SIGNAL LIST 1, 101: battery monitoring device
3: arrow direction
5: cell
11, 11a, 11b, 11c, 11d: battery
20, 20a, 20b, 20c, 20d: bus bar module
22: terminal
23: bus bar
24: board side terminal
25, 201: high-voltage circuit
31, 31a, 31b, 31c, 31d, 131: detection unit
32: board connector
33: board
34: first antenna
41: mounting member
44, 44a, 44b, 44c, 44d: second antenna
44': end antenna
45: communication bus bar
46: communication line
51, 151: battery ECU
61: power cable
202: low-voltage circuit
203: insulation element
204: connector
211: wire harness
A, B: enclosure

What is claimed is:

1. A battery monitoring device which is mounted in a vehicle and configured to detect state information of a battery including a plurality of cells connected in series, the battery monitoring device comprising:
   a detection unit mounted on the battery; and
   a mounting member mounted to the battery,
   wherein the detection unit comprises:
   a board including a circuit configured to detect the state information of the battery; and
   a first non-contact communication unit mounted on the board and configured to perform non-contact communication via electromagnetic wave,
   wherein the mounting member comprises:
   a second non-contact communication unit configured to perform non-contact communication with the first non-contact communication unit via the electromagnetic wave,
   wherein the first non-contact communication unit is configured to transfer the state information of the battery to the second non-contact communication unit, and the second non-contact communication unit is configured to transfer the state information of the battery transferred from the first non-contact communication unit to a host device, and the mounting member is configured to receive instruction information transmitted from the host device.

2. The battery monitoring device according to claim 1, wherein the first non-contact communication unit and the second non-contact communication unit are arranged to face each other.

3. The battery monitoring device according to claim 1, wherein the first non-contact communication unit includes a first antenna, and the second non-contact communication unit includes a second antenna, and wherein the first antenna and the second antenna can mutually transmit and receive the electromagnetic wave.

4. The battery monitoring device according to claim 3, wherein the second antenna includes a plurality of antennas,
   wherein the battery includes a plurality of batteries,
   wherein each of the plurality of the antennas corresponds to each of the plurality of the batteries, respectively,
   wherein one of the plurality of the antennas are connected to another adjacent antenna, and
   wherein the second antenna is connected to the host device via a single communication line.

5. The battery monitoring device according to claim 4, wherein a bus bar module is mounted on the battery,
   wherein the bus bar module includes bus bars configured to transmit respective voltages of the plurality of cells to the detection unit, and
   wherein the bus bar module is covered with the mounting member.

6. The battery monitoring device according to claim 1, wherein the host device includes a battery ECU.

* * * * *